United States Patent
Saers et al.

(10) Patent No.: US 11,593,089 B2
(45) Date of Patent: *Feb. 28, 2023

(54) METHOD AND CONTROL UNIT FOR CONFIGURING AN ADD-ON INTERFACE OF A VEHICLE

(71) Applicant: Scania CV AB, Södertälje (SE)

(72) Inventors: Alexander Saers, Hägersten (SE); Johan Aneros, Huddinge (SE); Henrik Felixson, Stockholm (SE); Simon Wretblad, Stockholm (SE); Carl Blumenthal, Nyköping (SE); Andreas Borg, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/956,993

(22) PCT Filed: Dec. 11, 2018

(86) PCT No.: PCT/SE2018/051280
§ 371 (c)(1),
(2) Date: Jun. 22, 2020

(87) PCT Pub. No.: WO2019/132754
PCT Pub. Date: Jul. 4, 2019

(65) Prior Publication Data
US 2020/0341748 A1 Oct. 29, 2020

(30) Foreign Application Priority Data
Dec. 27, 2017 (SE) .................................. 1751650-1

(51) Int. Cl.
*G06F 9/445* (2018.01)
*G06F 8/65* (2018.01)
(Continued)

(52) U.S. Cl.
CPC .................. *G06F 8/65* (2013.01); *G06F 8/61* (2013.01); *G06F 9/44526* (2013.01); *H04L 67/12* (2013.01)

(58) Field of Classification Search
CPC .......................................................... G06F 8/65
(Continued)

(56) References Cited

U.S. PATENT DOCUMENTS 4,680,732 A * 7/1987 DiCenzo ................. G06F 3/002
710/62
5,432,838 A * 7/1995 Purchase .............. H04B 5/0018
455/523
(Continued)

FOREIGN PATENT DOCUMENTS

| CN | 103797720 A | 5/2014 |
|---|---|---|
| WO | 2013039760 A1 | 3/2013 |
| WO | 2016147149 A1 | 9/2016 |

OTHER PUBLICATIONS

Scania CV AB, International Application No. PCT/SE2018/051280, International Search Report, dated Apr. 12, 2019.
(Continued)

*Primary Examiner* — Evral E Bodden
(74) *Attorney, Agent, or Firm* — Moore & Van Allen PLLC; W. Kevin Ransom (57) ABSTRACT

A method and control unit for configuring an add-on interface of a vehicle are presented. The vehicle includes at least one vehicle internal system, at least one add-on system arranged in the vehicle after manufacture, and at least one internal communication unit. The method includes receiving information related to at least one node of the at least one add-on system. The method also includes creating, based on the received information, a definition of at least one signaling used by the at least one node, and also configuring, by using the definition of the at least one signaling used by the
(Continued)

at least one node, an add-on interface. The add-on interface is arranged in the vehicle as an interface between the at least one vehicle internal system and the at least one add-on system.

13 Claims, 5 Drawing Sheets

(51) Int. Cl.
*G06F 8/61* (2018.01)
*H04L 67/12* (2022.01)

(58) Field of Classification Search
USPC .......................................... 717/171
See application file for complete search history.

(56) References Cited

U.S. PATENT DOCUMENTS

| | | | |
|---|---|---|---|
| 7,020,289 B1 | 3/2006 | Riggs | |
| 9,290,153 B2* | 3/2016 | Ricci | G09G 5/37 |
| 10,481,777 B2* | 11/2019 | Dai | B60K 37/02 |
| 2008/0111666 A1* | 5/2008 | Plante | G07C 5/008 |
| | | | 340/425.5 |
| 2011/0046788 A1 | 2/2011 | Daly et al. | |
| 2013/0079951 A1* | 3/2013 | Brickman | B60N 2/0244 |
| | | | 701/2 |
| 2013/0332844 A1* | 12/2013 | Rutledge | G06F 3/0484 |
| | | | 715/744 |
| 2014/0350749 A1 | 11/2014 | Kwak | |
| 2016/0014105 A1 | 1/2016 | Kim et al. | |
| 2016/0031389 A1 | 2/2016 | Grimm et al. | |
| 2016/0071333 A1 | 3/2016 | Haidar et al. | |
| 2016/0197740 A1 | 7/2016 | Risse et al. | |
| 2016/0274882 A1 | 9/2016 | Fazi | |
| 2017/0262301 A1 | 9/2017 | Bai et al. | |
| 2018/0373259 A1* | 12/2018 | Aberle | A01B 69/008 |

OTHER PUBLICATIONS

Scania CV AB, International Application No. PCT/SE2018/051280, Written Opinion, dated Apr. 12, 2019.

Scania CV AB, Swedish Application No. 1751650-1, Office Action, dated Sep. 12, 2018.

Scania CV AB, Swedish Application No. 1751650-1, Office Action, dated Apr. 11, 2019.

Scania CV AB, Swedish Application No. 1751650-1, Office Action, dated Dec. 6, 2019.

Scania CV AB, International Application No. PCT/SE2018/051280, International Preliminary Report on Patentability, dated Jun. 30, 2020.

Scania CV AB, Korean Patent Application No. 10-2020-7020586, Office Action, dated Jul. 28, 2021.

Scania CV AB, European Patent Application No. 18895494.5, Extended European Search Report, dated Aug. 18, 2021.

Scania CV AB, Chinese Patent Application No. 201880081598.8, First Office Action, dated Aug. 29, 2022.

* cited by examiner

METHOD AND CONTROL UNIT FOR CONFIGURING AN ADD-ON INTERFACE OF A VEHICLE

CROSS-REFERENCE TO RELATED APPLICATIONS

This application is a national stage application (filed under 35 § U.S.C. 371) of PCT/SE2018/051280, filed Dec. 11, 2018 of the same title, which, in turn, claims priority to Swedish Application No 1751650-1 filed Dec. 27, 2017; the contents of each of which are hereby incorporated by reference.

FIELD OF THE INVENTION

The present invention relates to a method for configuring an add-on interface of a vehicle. The present invention also relates to a control unit arranged for configuring an add-on interface of a vehicle. The present invention also relates to a computer program and a computer-readable medium comprising instructions for carrying out the method according to the invention.

BACKGROUND OF THE INVENTION

The following background information is a description of the background of the present invention, which thus not necessarily has to be a description of prior art.

Vehicle manufacture may be conducted in a variety of ways. In for example the car industry, the manufacturer usually produces vehicles that are complete and intended for direct delivery to final customers.

The heavy vehicle industry, however, commonly also employs other kinds of production methods. Manufacturers of heavy vehicles may, as in the car industry, produce vehicles intended for delivery directly to final customers or final users of the vehicles. However, it is also common that heavy vehicles produced by the manufacturer are only partly manufactured, i.e. are only completed to a certain extent, including vehicle internal systems, in view of being subsequently completed by another part than the manufacturer, for example a user or a customer of the manufacturer, e.g. a third-party supplier, in such a way as to meet specific requirements of the final customers or users.

It may also be that the vehicle, although substantially completed by its manufacturer, will be provided with further functionalities and/or systems, in this document denoted add-on systems, e.g. by another party such as a third-party supplier, a customer, or a final user, before it is put into use. It is for example usual that commercial vehicle manufacturers, as well as producing fully equipped vehicles, produce also vehicle versions being only partly manufactured, for example intentionally comprising only the chassis, or the chassis and the driver compartment/cab. The partially manufactured vehicle is then intended to be subsequently completed with one or more additional systems and/or functionalities by another party than the manufacturer, in accordance with the specific requirements of the another party, being e.g. a final customer and/or final user.

For example, chassis produced by a vehicle manufacturer may be designed to be usable in any desired way as bases for building on in order to construct mobile homes, fire vehicles, ambulances, concrete mixer trucks, refrigerated vehicles, or any other especially adapted vehicle. Also, for example a bus chassis may be produced by the vehicle manufacturer with little or no bodywork, with the intention to complete the vehicle with subsequent building-on performed by a bus bodybuilder. Generally, a bodybuilder installs/adds one or more add-on systems, i.e. does bodywork, on a vehicle after its original manufacture.

Thus, the building-on and/or addition of one or more systems and/or functionalities carried out by another party may be very extensive, and at least some building-on is also very common in the case of heavy vehicles. For this reason, the vehicle manufacturer often also prepares the vehicle in such a way as to facilitate subsequent building-on.

For example, one or more power takeoffs are often included in the vehicle by the manufacturer, e.g. so that add-on systems may be connected for example to the vehicle's engine and/or gearbox to enable them to be provided with driving power from the vehicle. There may also be connections to make it possible to use, for example, the vehicle's electrical system, hydraulic system and/or pneumatic system for implementation of add-on functions. A vehicle may thus be provided with a plurality of power takeoffs, and the power takeoff requirement may vary depending on the kinds of applications built onto the vehicle. Certain applications may for example require power which is constantly available when the engine of the vehicle is running, irrespective of whether the vehicle is moving or not, e.g. in the case of concrete mixer trucks, refrigeration units in refrigerated vehicles. Other applications may only need power on distinct occasions, e.g. upon activation of an additional system. The activation of a power takeoff for, and hence activation of the operation of, one or more built-on systems and/or functionalities is often not such that continuous or unregulated power takeoff is desirable, since it is only usually required in certain situations, e.g. upon a demand from the built-on systems and/or functionalities themselves or from, for example, the vehicle's driver.

SUMMARY OF INVENTION

The one or more add-on systems being implemented in the vehicle are often unknown for the vehicle internal systems, i.e. for the internal systems being provided by the manufacturer. Thus, the one or more add-on systems may be unknown for manufacturer of the vehicle, and therefore also initially for the add-on interface of the vehicle. Generally, the manufacturer cannot, already when the vehicle is produced, know which add-on systems that will be added to the vehicle later on, and the vehicle can obviously therefore also not possibly be equipped to interact with such unknown add-on systems.

Thus, it may be impossible to perform actions, functions and/or operations in the vehicle based e.g. on signals provided by the add-on systems, since the signals cannot even be interpreted by the vehicle internal systems and/or the add-on interface. Hereby, there is a risk that important actions, functions and/or operations are not properly performed in the vehicle.

Conventionally, when unknown add-on systems have been added/implemented/installed in the vehicle, the manufacturer of the vehicle has had to perform a software update, e.g. an update demanding a new compilation, i.e. a translation from a source code to a target code, of the programming code. Such a software update is costly and time demanding, and often has to be performed in a work shop, which results in vehicle of road situations.

It is therefore an object to solve at least some of the above-mentioned disadvantages.

The object is achieved by a method for configuring an add-on interface of a vehicle, the vehicle including:
- at least one vehicle internal system;
- at least one add-on system, the add-on system being arranged in the vehicle after the vehicle is produced by a manufacturer; and
- at least one internal communication unit arranged for communication with at least one vehicle external communication unit.

The method includes:
- receiving, by usage of the at least one internal communication unit, information related to at least one node of the at least one add-on system from the at least one vehicle external communication unit;
- defining, based on the information related to the at least one node, at least one signaling used by the at least one node;
- configuring, by using the definition of the at least one signaling used by the at least one node, an add-on interface, the add-on interface being arranged in the vehicle as an interface between the at least one vehicle internal system and the at least one add-on system.

Hereby, the add-on interface may, based on information provided e.g. by a final user and/or a customer, be adapted for communication with essentially any possible add-on system that is implemented in the vehicle. The add-on interface is here adapted/adjusted by usage of parameter adaption/adjustment, which does not demand a compilation of programming code and/or update of the actual programming code. Thus, the manufacturer of the vehicle does not have to be involved in the update of the add-on interface, which dramatically reduces the cost and time, possibly including vehicle off road time, that conventionally has been needed for performing such updates. Instead, the final user and/or a customer, which may have better knowledge of the added add-on systems, can adapt the configuration of the add-on interface by transmitting configuration information, related e.g. to the signaling to be used, to the vehicle. The configuration information is transmitted by use of the at least one internal and at least one external communication units.

Since the add-on interface is adapted to match the signaling used of the at least one add-on system, the signals provided by the at least one add-on systems may also be available in an add-on interface configuration tool, and may thus be used for defining logical operations that are to be performed in these signals.

A flexible add-on interface is hereby provided, which by the final user and/or customer easily may be adapted/adjusted/configured to match the at least one add-on system being implemented in the vehicle. The adaption/adjustment/configuration may completely be controlled by another part than the manufacturer, such as a final user and/or a customer, that normally have better knowledge about some of the add-on systems than the original manufacturer has.

Thus, essentially any off-the-shelf products may be implemented as an add-on system in the vehicle, without having to perform a software update. Instead, the final user and/or customer may itself easily and reliably update/adjust the add-on interface, without involvement of the manufacturer. The final user and/or customer may then also define logical operations, or essentially any suitable operation, based on signals provided by the add-on systems and/or any vehicle internal systems, without involving the manufacturer.

By way of embodiments of the present invention, the addition of an add-on system to the vehicle is facilitated.

According to an embodiment of the present invention, the method further includes:
- receiving, by usage of the at least one internal communication unit, information related to at least one functionality of the add-on interface;
- defining at least one functionality based on the definition of the at least one signaling used by the at least one node, and on the information related to at least one functionality;
- configuring, by using the definition of the at least one functionality, the add-on interface.

Hereby, a flexible adaption/adjustment of the configuration of the add-on interface may reliably and easily be performed, such that essentially any function and/or operation, e.g. a logical operation, may be performed by the add-on interface. Thus, an output resulting from essentially any logical combination/function/operation on any signal being input to the add-on interface may be provided to an arbitrary output of the add-on interface.

According to an embodiment of the present invention, the defining of the at least one functionality is based also on at least one signaling used by the at least one vehicle internal system.

Hereby, a combination of the signals of the internal vehicle systems and the add-on systems may be used as inputs and outputs when the functionality of the add-on interface is defined and configured.

According to an embodiment of the present invention, the information related to at least functionality of the add-on interface is received from one or more of:
- a final user of the vehicle;
- at least one other part than the manufacturer, the at least one other part having knowledge of, e.g. providing, the at least one add-on system; and
- the manufacturer.

Thus, the add-on interface may be flexibly updated/configured based on information provided by a number of sources. Since the update/configuration does not involve a software/firmware update, possibly including compilation, essentially anyone with knowledge of the add-on systems may be able to update the add-on interface, wherefore the vehicle does not have to go to the workshop for the update/configuration.

According to an embodiment of the present invention, the at least one signaling used by the at least one node includes one in the group of:
- at least one control system network signal;
- at least one controller area network (CAN) signal;
- at least one digital signal;
- at least one analog signal;
- at least one signal transferred by a wireless connection; and
- at least one signal transferred by a wired connection.

Since the intelligent add-on interface can handle a large variety of signals, the add-on systems may very flexibly be implemented in the vehicle.

According to an embodiment of the present invention, the configuring of the add-on interface is performed without involvement of the manufacturer of the vehicle.

Hereby, an add-on interface update/configuration is provided, which may be flexible and may be easily performed e.g. by a final user, without having to take the vehicle to the manufacturer and/or to the workshop, which reduces both costs and vehicle off road time. Also, the configuration of the add-on interface is performed by updating/adjusting one or more parameter values, i.e. by a parameter update. Such a parameter update may be performed/initiated by another part than the manufacturer, e.g. a customer and/or a final user, without risking that the important programming code is altered in a negative way. Thus, since the configuration of the add-on interface is achieved by parameter adaption/adjustment, the manufacturer can be certain that the programming code defining the add-on interface, which is often provided by the manufacturer, is intact/unaffected by the configuration.

According to an embodiment of the present invention, the information related to at least one node of the at least one add-on system is received from one or more of:
a final user of the vehicle;
at least one other part than the manufacturer, the at least one other part having knowledge of the at least one add-on system; and
the manufacturer.

Thus, the add-on interface may be flexibly updated/configured based on information provided by a number of sources. Since the update/configuration does not involve a software/firmware update, possibly including compilation, essentially anyone with knowledge of the add-on systems, e.g. a provider of the add-on systems, may be able to update the add-on interface, wherefore the does not have to go to the workshop for the update/configuration.

The object is also achieved by the above-mentioned control unit arranged for configuring an add-on interface of a vehicle, the vehicle including:
at least one vehicle internal system;
at least one add-on system, the add-on system being arranged in the vehicle after the vehicle is produced by a manufacturer; and
at least one internal communication unit arranged for communication with at least one vehicle external communication unit.

The control unit being configured/arranged for:
receiving, by usage of the at least one internal communication unit, information related to at least one node of the at least one add-on system from the at least one vehicle external communication unit;
defining, based on the information related to the at least one node, at least one signaling used by the at least one node; and
configuring, by using the definition of the at least one signaling used by the at least one node, an add-on interface, the add-on interface being arranged in the vehicle as an interface between the at least one vehicle internal system and the at least one add-on system.

The control unit according to the present invention has corresponding advantages as mentioned abode for the method.

The object is also achieved by the above-mentioned computer program and computer-readable medium.

Detailed exemplary embodiments and advantages of the method, control system, computer program and computer-readable medium according to the invention will below be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF INVENTION

Figure 1:
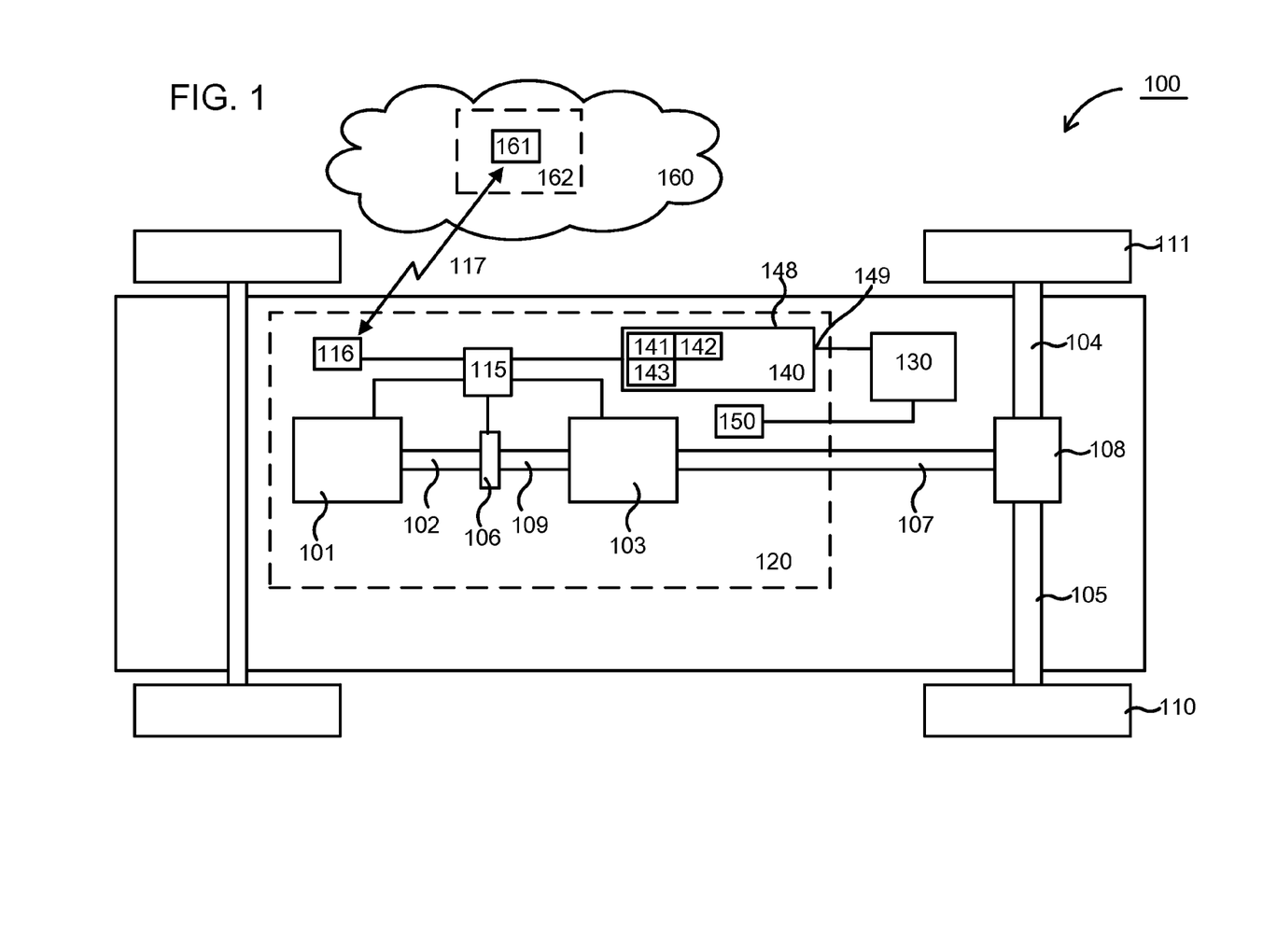
FIG. 1 is a schematic illustration of a non-limiting example of a vehicle in which the embodiments of the present invention may be implemented.

FIG. 1 schematically illustrates a power train in a vehicle 100, in which the embodiments of the present invention may be implemented. The illustrated vehicle 100 has only one axle 104, 105 with tractive/drive wheels 110, 111, but the invention is also applicable to vehicles which have more than one axle provided with tractive wheels. The power train comprises a combustion engine 101 which in a conventional way, via an output shaft 102 of the engine, usually via a flywheel, is connected to a gearbox 103 via a clutch 106 and an input shaft 109 connected to the gearbox 103.

The engine may be controlled by the vehicle's control system via a control unit 115. The clutch 106, which may for example take the form of an automatically controlled clutch, and/or the gearbox 103, which may for example be a conventional automatic gearbox, may also be controlled by means of one or more suitable control units, generally depicted as the control unit 115 in FIG. 1. Thus, the function of the control unit 115 may be provided by two or more control units, as is mentioned more in detail below.

The vehicle 100 may further include at least one internal communication unit 116, being associated/connected to one or more control units 115 of the vehicle. For example, the at least one internal communication unit 116 may be included in a control system network of the vehicle 100. The control system network may, as is described below, essentially include any suitable communication interface facilitating communication between control units/devices/entities in the vehicle 100. For example, the communication interface connects the one or more vehicle internal systems 120 with each other, including connecting the at least one internal communication unit 116 with the control unit 115 and other internal systems 120 of the vehicle 100. Such a communication interface many for example, include a controller area network (CAN), an Ethernet connection, a Flexray bus, a local interconnect network (LIN) bus and/or a WiFi connection.

The at least one internal communication unit 116 is arranged for communication with at least one vehicle external communication unit 161, i.e. arranged for transmitting information to and/or receiving information from the at least one vehicle external communication unit 161. The at least one vehicle external communication unit 161 is arranged outside of the vehicle 100, and may be included in and/or associated/connected to essentially any suitable external device/node/apparatus/entity 162, such as e.g. at least one web and/or internet related unit, at least one internet cloud 160 related unit, at least one infrastructure unit, at least one external communication entity included in at least one other vehicle, at least one server and/or at least one database. The at least one vehicle external communication unit 161 may also be included in and/or associated/connected to essentially one or more of the units/devices/entities 411, 412, 413, 414, 420, 430, 440 of an add-on/bodybuilder network 410, as is described more in detail below.

The communication between the at least one internal 116 and at least one external 161 communication units may be performed by usage of a wireless connection 117, e.g. a connection working according to essentially any suitable wireless standard, specification and/or protocol, such as according to the Global System for Mobile communications (GSM) standard, the General Packet Radio Service (GPRS) standard, the Bluetooth standard, any suitable wireless local area networking (WiFi) standard, any suitable generation of a broadband cellular technology (3G, LTE, 4G, 5G) standard, and/or any other suitable wireless standard. Alternatively, the connection 117 may also be a wired connection, including usage of at least one cable or other wiring equipment.

As illustrated in FIG. 1, an output shaft 107 from the gearbox 103 drives the tractive wheels 110, 111 via a final gear 108, e.g. a conventional differential, and driveshafts 104, 105 which are connected to said final gear.

The engine 101, the clutch 106 and the gearbox 103 may be examples of vehicle internal systems 120. As is understood by a skilled person, the vehicle may include a large number of such vehicle internal systems 120, i.e. systems arranged in the vehicle 100 when it was produced by the manufacturer.

In this document, parts, systems and/or functionalities being included/arranged in the vehicle already at vehicle manufacture/production by the manufacturer is commonly denoted vehicle internal system 120. Correspondingly, parts, systems and/or functionalities being included/arranged in the vehicle after the manufacture/production by the manufacturer is commonly denoted add-on systems 130 in this document. The manufacturer is in this document defined as a producer of the original/initial vehicle, being partly completed with at least one vehicle internal system 120 but lacking the later added at least one add-on system 130. The manufacturer of the partly completed vehicle may also be denoted as original equipment manufacturer (OEM). The one or more add-on systems 130 may be provided by another party, which in this document means a party which may be another and/or independent of the vehicle manufacturer, and to which a vehicle produced by the vehicle manufacturer is directly or indirectly delivered after being manufactured/produced. Thus, the other party may be a customer or a final user, but may also be a third-party supplier, which carries out building-on, i.e. addition of one or more add-on systems 130, before delivery to a final customer.

It should be noted that the vehicle depicted in FIG. 1 is merely one example of how the vehicle might be configured, as the embodiments of the invention are applicable to all types of vehicles, e.g. those with hybrid power trains, electric vehicles and/or other kinds of axle configurations, other types of gearboxes with or without clutches etc.

The one or more add-on systems 130 illustrated in FIG. 1 may be provided with power from one or more takeoffs 150, which may be situated at various locations in the vehicle 100.

The one or more add-on systems 130 may be of various kinds, e.g. one might comprise activation of a crane function via a power takeoff, whereas another might comprise illumination of a certain warning lamp at the vehicle driver's location. Thus, the one or more add-on systems 130 may be of a simple kind, i.e. have a low complexity, but may also have substantially any desired functionality, and thus also any complexity.

The one or more add-on systems 130 may need, i.e. may have a demand for, power to be provided to the add-on systems 130. The one or more add-on systems 130 may also need, i.e. may have a demand for, being able to communicate with an internal control system of the vehicle, in order to be provided with one or more signals, parameters and/or control signals available in the internal control system, and/or to be able to provide one or more signals, parameters and/or control signals to the one or more vehicle internal systems 120 via the vehicle internal control system. The one or more add-on systems 130 may also need, i.e. may have a demand for, being able to communicate with one or more nodes/devices/entities/equipment external from the vehicle.

Power needed by the one or more add-on systems 130 may e.g. be provided by the above mentioned one or more power takeoffs 150 and/or may be provided by an add-on interface 140 arranged for providing communication between the one or more vehicle internal systems 120 and the one or more add-on systems 130. The communication between the one or more vehicle internal systems 120 and the one or more add-on systems 130 is facilitated by the add-on interface 140. Thus, the add-on interface communicates one or more signals, parameters and/or control signals between the one or more vehicle internal systems 120 and the one or more add-on systems 130. Thus, the add-on interface 140 is provided as a general interface between said at least one vehicle internal system 120 and said at least one add-on system 130. The add-on interface includes one or more inputs/outputs, for example input/output pins, to which systems, such as e.g. add-on systems, may be connected. Via these inputs/outputs, signals are received/transmitted to the systems connected to the add-on interface 140. For example, the one or more add-on systems may be connected to one or more inputs of the add-on interface, and may provide signals of any suitable signaling format, which is often related to the specific add-on system providing the signal, to the one or more inputs. Essentially, any signaling format mentioned in this document may be received at the one or more inputs. Correspondingly, signals may also be output on the one or more outputs of the add-on interface 140, on a suitable signaling format, such as any signaling format mentioned in this document.

As mentioned above, the at least one internal communication unit 116, and also the vehicle internal system 120, may be included in a control system network of the vehicle 100, which may include the above-mentioned communication interface connecting the one or more vehicle internal systems 120 with each other. Such a communication interface may for example, include a controller area network (CAN), an Ethernet connection, a Flexray bus, a local interconnect network (LIN) bus and/or a WFi connection. Such a communication interface may be generally used for connecting units/devices/entities/interfaces in the vehicle 100, such as connecting the add-on systems 130 to the add-on interface 140. The at least one add-on system 130 may be connected to an external control system network input, e.g. an external controller area network (CAN) input 149, of an interface/control unit 148 including the add-on interface 140. Hereby, a connection between the one or more add-on systems 130 and the communication interface, such as e.g. the controller area network (CAN), is provided, which is used for connecting the one or more add-on systems 130 to the one or more vehicle internal systems 120, via the communication interface, e.g. via the controller area network (CAN).

Thus, the one or more add-on systems 130 may need various information to be provided to them, from within the vehicle and/or from outside of the vehicle, and may therefore have a demand for communication abilities. The one or more add-on systems 130 may also demand resources from the vehicle, such as e.g. status signals from the vehicle, i.e. the signal state of appropriate outputs of the interface/ control unit 148 including/implementing the add-on interface 140. The resources which the one or more add-on systems demand for their functions may for example take the form of a demand for mechanical power, electric power, hydraulic power and/or pneumatic power, and/or may take the form of a demand for at least one signal and/or at least one function of the control system of the vehicle. Normally, a demanded power, requiring activation of a power takeoff 150 has to be demanded from the internal control system of the vehicle 100. Where resources are demanded, they are often not constantly demanded, and are also often not constantly available.

Vehicle manufacturers are reluctant for some other party, e.g. a third-party supplier, to effect changes directly in the internal control system of the vehicle, since this may affect the performance of the vehicle in ways which are both undesirable and difficult to predict. This is also why the vehicle manufacturer provides the add-on interface 140, i.e. a signaling interface which can be used for an add-on system for communication with the internal control system of the vehicle.

The add-on interface 140 may be of various kinds, and may include a number of inputs and outputs, which each may have a certain function assigned to it. One output might for example represent activation of a vehicle internal system 120, e.g. a parking brake activation, and when the parking brake is applied this output might for example be set to a high level, in order to thereby communicate the activation of the internal system, e.g. the parking brake, to the one or more add-on systems 130. As is understood by a skilled person, a large number of other examples of functions, whose status may be signaled in a similar way, may be provided by the add-on interface 140. These signals may then be used by the one or more add-on systems 130, but subject for example to various conditions, which usually have to be fulfilled for a certain function to be activated.

Thus, by the add-on interface 140, the vehicle manufacturer may provide a building-on interface to enable communication between the internal systems 120 and the add-on system 130. The add-on interface 140 may for example comprise one or more terminal blocks having a number of inputs/outputs, such that high/low/numerical signals on an output may for example represent a status of a certain function, and this information may be used as a control signal for conditional control of add-on system functions. There may also be inputs, e.g. for conveying from the add-on systems 130 signaling, e.g. such that inputting a high signal level on a certain input indicates a demand for activation of a function having a defined meaning.

As a given chassis configuration may be used for add-on systems within a large number of areas of application, it is often not possible at vehicle manufacturing stage to know the specific intended use of a specific chassis, still less the characteristics of specific add-on systems 130. Thus, the add-on systems may communicate their status, e.g. whether the function is active or inactive, by applying e.g. a voltage to an input on the add-on interface 140, which will be communicated further to the internal control system and/or vehicle internal systems 120 by the add-on interface 140. The internal communication system and/or the vehicle internal systems 120 will thus also be aware that add-on systems 130 exist and their status.

Control systems in modern vehicles usually comprise a communication bus system comprising of one or more communication buses arranged for connecting together a number of electronic control units (ECUs), e.g. the control units, or controllers, and various systems/components/devices on board the vehicle. Such a control system may comprise a large number of control units and the responsibility for a specific function may be spread over more than one of them.

For sake of simplicity, FIG. 1 shows only some such control units 115, 140. However, parts of the present invention may be implemented in any suitable control unit, e.g. the control units 115, 140, or wholly or partly in one or more other control units on board the vehicle 100. Control units of the kind depicted are normally adapted to receiving sensor signals from various parts and/or control units of the vehicle. Control units are also usually adapted for delivering control signals to various parts and components of the vehicle, e.g. the control units 115, 140 may deliver signals to suitable actuators for activation of power takeoffs and/or for activation of other vehicle internal systems 120.

The control unit 115 is in FIG. 1 schematically illustrated as receiving signals and/or providing control signals from and/or to the engine 101, the clutch 106 and/or the gearbox 103. The control unit 115 may, also receive and/or provide control signals to and/or from other internal systems/devices 120 in the vehicle 100.

According to some embodiments of the present invention, as described in this document, the add-on interface 140 may comprise reception means 141 arranged for receiving information, e.g. a reception unit 141, definition means 142 arranged for defining at least one signaling, e.g. a signaling unit 142, and configuration 143 arranged for configuring the add-on interface, e.g. a configuration unit 143. These control means/units/devices 141, 142, 143, are described more in detail below, and may be divided physically into more entities than the herein described interface control unit 148, or may be arranged in less entities than herein described, e.g. in one control unit.

Figure 2:
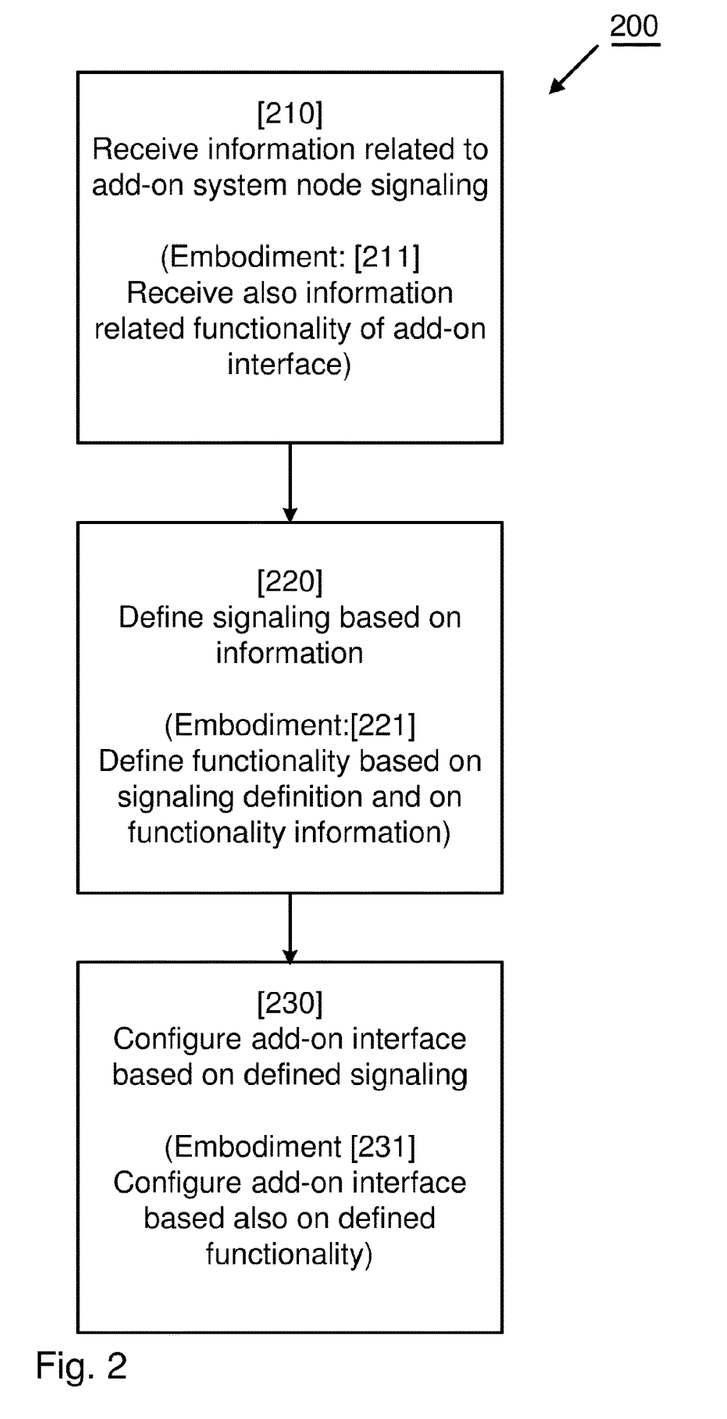
FIG. 2 shows a flow chart diagram for some embodiments of the present invention,
FIG. 3 schematically illustrates an interface control unit,
FIG. 4 schematically illustrates a non-limiting example of a system, in which embodiments of the present invention may be implemented.

FIG. 2 shows a flow chart diagram for a method 200 according to an embodiment of the present invention, i.e. a method for configuring an add-on interface 140 of a vehicle. The method steps of FIG. 2 may be performed in another order than illustrated in FIG. 2, as long as the information needed for performing a method step is available when the step is to be performed.

The vehicle 100 includes at least one vehicle internal system 120, at least one add-on system arranged in the vehicle after manufacture, and at least one internal communication unit 116 arranged for communication with at least one vehicle external communication unit 161, as described in this document.

In a first step 210 of the method according to the present invention, information related to at least one node of the at least one add-on system 130 is received from the at least one vehicle external communication unit 161 by usage of the at least one internal communication unit 116, which is arranged for communicating with the at least one vehicle external communication unit 161. The at least one node may here correspond to at least one add-on system, respectively, and/or to a unit/device/node which may be associated, e.g. connected to, at least one add-on system. The first step 210 may e.g. be performed by the use of a below described reception unit/means 141.

In a second step 220 of the method according to the present invention, at least one signaling used by the at least one add-on system node is defined based on the information related to the at least one node, e.g. by use of a below described definition unit/means 142.

In a third step 230 of the method according to the present invention, the add-on interface 140 arranged in the vehicle 100 as an interface between the at least one vehicle internal system 120 and the at least one add-on system 130 is configured, by using the definition of the at least one signaling used by the at least one node. The third step 230 may be performed by use of a below described configuration unit/means 143.

By usage of the present invention, the final user and/or a customer, which may have better knowledge of the added add-on systems, can adapt the configuration of the add-on interface by simply transmitting configuration information, related e.g. to the signaling to be used, to the vehicle. The add-on interface may hereby be adapted to match the signaling used of the at least one add-on system, whereby the signals provided by the at least one add-on systems may also be used for defining logical operations in an add-on interface configuration tool that are to be performed based on these signals. Hereby, the adaption/adjustment/configuration may completely be controlled by another part than the manufacturer, such as a final user and/or a customer, that normally have better knowledge about some of the add-on systems than the original manufacturer has. In other words, the configuring 230 of the add-on interface 140 may be performed without involvement of the manufacturer of the vehicle 100, which is very flexible for the final user and/or customer.

The signaling, which the add-on interface 140 is configured to match, i.e. which the add-on interface 140 is configured for being able to interpret/understand/detect, may include transmission and/or reception of essentially any kind of signal, such as for example at least one control system network signal, such as e.g. at least one controller area network (CAN) signal. The signals may be digital and/or analog, and may be transferred by a wireless and/or a wired connection. The flexible add-on interface used by the embodiments of the present invention may be configured/adapted to match any of these signals and/or signal types.

According to an embodiment of the present invention, the add-on interface may also be configured to have at least one functionality, i.e. to be able to perform one of more functions and/or operations based on one or more inputs, such as based on input signals.

This embodiment is also illustrated in FIG. 2. According to the embodiment, information related to at least one functionality of the add-on interface 140 is also received 211 by usage of the at least one internal communication unit 116 communicating with the at least one external communication unit 161.

Further, at least one functionality is defined 221 based on the definition of the at least one signaling used by the at least one add-on system node, and on the received 211 information related to at least one functionality. Thus, with knowledge of the used signaling and of the wanted functionality, the functions and/or operations to be performed by the add-on interface may be properly defined 221.

Then, the add-on interface 140 is configured 231 also regarding the functionality. The configuration is performed by using the defined 221 at least one functionality.

According to an embodiment, the definition 221 of the at least one functionality is based also on at least one signaling used by the at least one vehicle internal system 120. Hereby, the functions and/or operations defined by the functionalities may use signals from the vehicle internal systems 120 as input signals and/or may output a resulting output signal on a signaling format matching the at least one vehicle internal systems 120.

Generally, the information related to at least one node of the at least one add-on system 130 and/or the information related to at least one functionality of the add-on interface 140 may be received from, i.e. may be provided/inputted essentially anyone, e.g. by usage of an add-on interface configuration tool 414. For example, the information related to at least one node of the at least one add-on system 130 and/or the information related to at least one functionality of the add-on interface 140 may be provided by a final user of the vehicle 100, or by at least one other part than the manufacturer, such as e.g. a customer, wherein the at least one other part may have provided, manufactured, installed and/or adapted the at least one add-on system 130. Of course, the information related to at least one node of the at least one add-on system 130 and/or to the at least one add-in interface functionality may also be provided by the manufacturer of the vehicle. Hereby, a very flexible add-on interface is provided.

Figure 3:
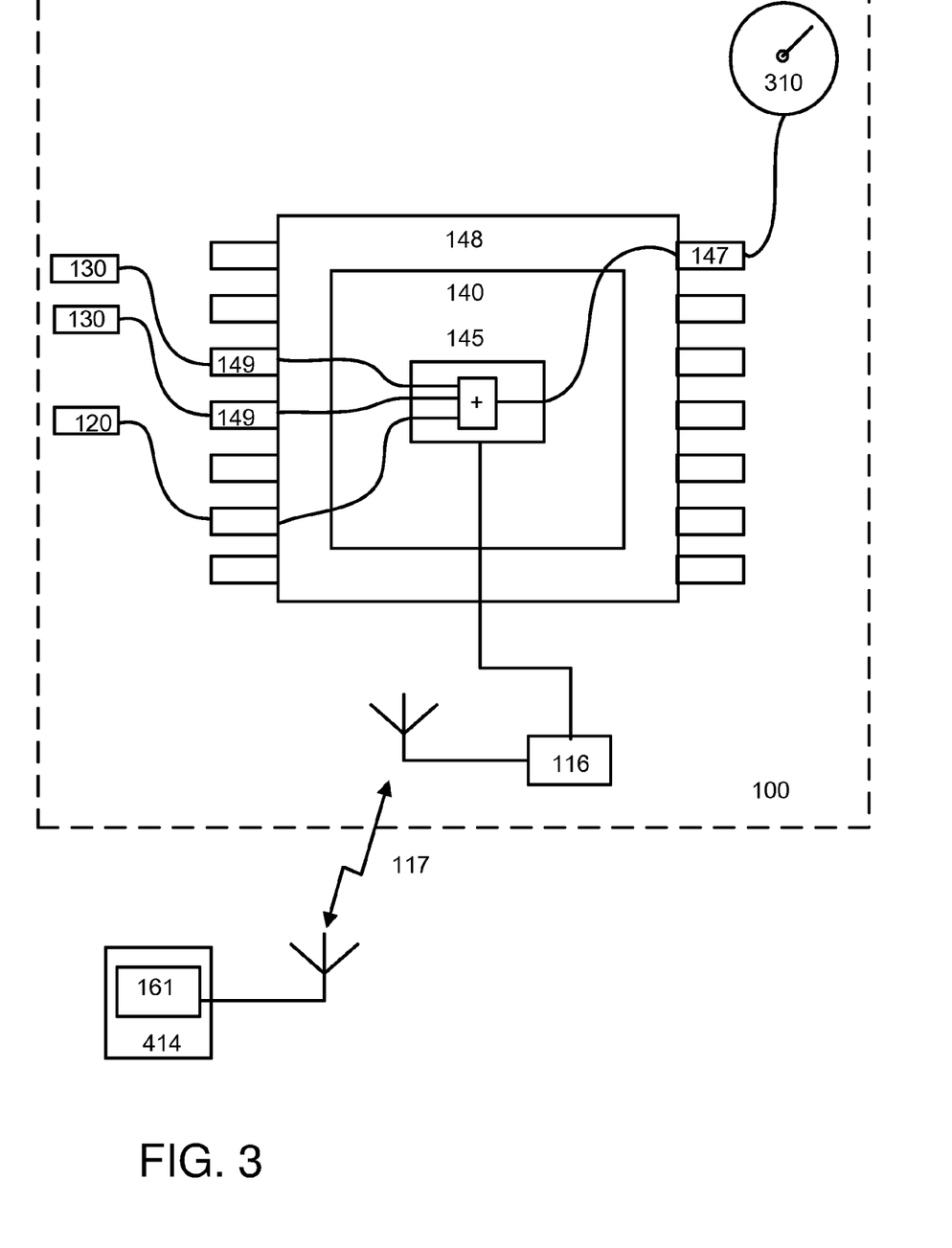

FIG. 3 schematically illustrates a non-limiting example of an embodiment of the present invention. The add-on interface 140 may, as mentioned above, be adapted for communication with essentially any possible add-on system that is implemented in the vehicle. This adaption is, according to an embodiment based on information provided e.g. by a final user and/or a customer, by usage of an add-on interface configuration tool 414, which is associated with at least one external communication unit 161. The at least one external communication unit 161 transfers the adaption/configuration information from the add-on interface configuration tool 414 to the add-on interface 140 via the at least one internal communication unit 116.

The add-on interface 140 is adapted/adjusted/configured based on the information by usage of parameter adaption/adjustment/configuration, which does not demand a compilation of programming code and/or update of the actual programming code. Hereby, the add-on interface 140 is adapted/adjusted/configured to match the signaling used by the at least one add-on system 130, and the signals provided by the at least one add-on systems 130 may therefore be used by the add-on interface configuration tool 414. The final user and/or customer may then, based on the signals from the add-on system 130, and possibly also based on signals from one or more vehicle internal systems 120 define logical operations that are to be performed on these signals in the add-on interface 140. The add-on interface 140 may thus then, by use of, i.e. based on inputs to, the add-on interface configuration tool 414, be adapted/adjusted/configured for performing such operations. In FIG. 3, a non-limiting example of a logical operation 145 in the form of a summation of two signals from two add-on systems 130, respectively, and one signal from a vehicle internal system 120 is illustrated. An output signal is provided to an output, such as e.g. an output pin 147 of the add-on interface 140, and is available for essentially any usage in the vehicle, e.g. for being displayed in an instrument 310. The two signals from the two add-on systems 130 may be input on an external control system network input 149, e.g. an external CAN input. The signal from the vehicle internal system 120 may be input on essentially any suitable input of the add-in interface 140. Also, a processed signal $S_{proc}$ provided by the add-on interface 140, e.g. a signal provided by one or more operation/function blocks 145 of the add-on interface and/or a processed sensor signal may be input to other operation/function blocks 145 of the add-on interface, such that further operations/functions may be performed in the processed signal $S_{proc}$.

Thus, the final user and/or customer may easily adapt/adjust/configure the add-on interface 140 to match the at least one add-on systems being implemented in the vehicle, such that the functions/operations in the vehicle may involve the add-on systems 130.

Figure 4:
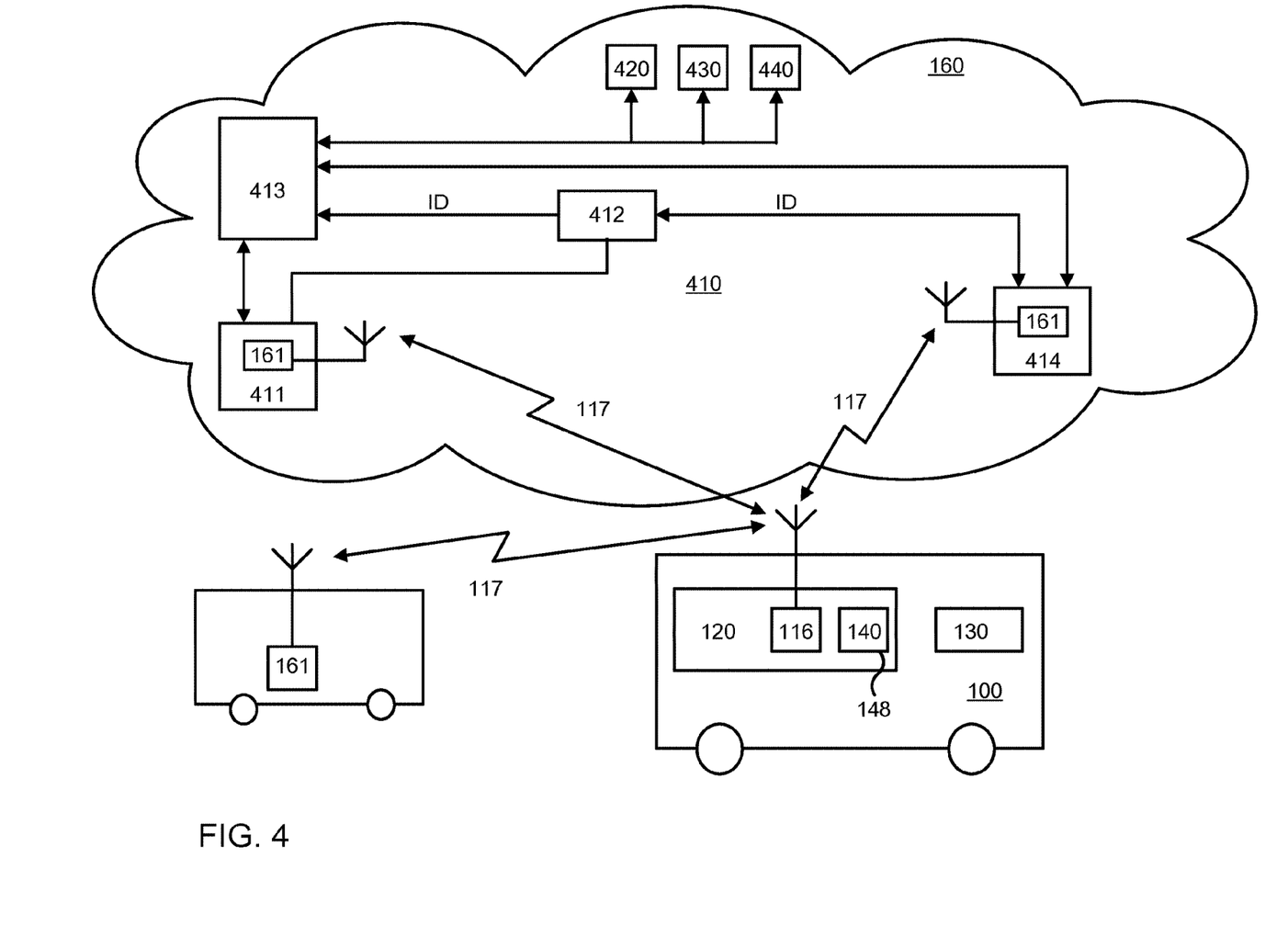

FIG. 4 schematically illustrates a system facilitating a general platform for handling vehicles including one or more add-on systems 130. As is understood by a skilled person, FIG. 4 for pedagogical reasons only shows some of the units/devices/entities/nodes in such a system. Essentially, only the units/devices/entities/nodes useful for explaining the concept are schematically illustrated in FIG. 4.

A vehicle 100, as the one described in this document, includes one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located essentially anywhere outside of the vehicle, e.g. in another vehicle and/or in one or more nodes 411, 412, 413, 414, 420, 430, 440 of an add-on/bodybuilder network 410. The one or more nodes 411, 412, 413, 414, 420, 430, 440 of the add-on/bodybuilder network 410 may be located e.g. in a web/internet/cloud related unit, in an infrastructure unit, in a server and/or in a database, as mentioned above. Generally, the add-on/bodybuilder network 410 may be implemented as an internet cloud 160 related solution. Generally, the one or more nodes 411, 412, 413, 414, 420, 430, 440 of an add-on/bodybuilder network 410 are in FIG. 4 for pedagogic reasons illustrated as separate nodes. However, these nodes may be implemented less nodes than illustrated in FIG. 4.

The add-on interface 140 utilized for the embodiments of the present invention may be an advanced and flexible interface provided with advanced logical functionality and possibilities for flexible definition of interface inputs and/or outputs. According to an embodiment, the logical functionality providable by the add-on interface 140 includes essentially any useful logical, numerical and/or mathematical operations, that may be operated on one or more signals input to the add-on interface 140. The input signals may here, according to various embodiments, include essentially any kind of signal, such as digital and/or analog signals, comprising well defined signal value levels and/or numerical signal values. Thus, the add-on interface 140 used by the embodiments of the present invention may be considerably more advanced than conventional add-on interfaces are, including e.g. processing of numerical signals, representation of physical values as numerical values, and/or performing numerical operations on the numerical values/signals.

The add-on interface 140 may also easily be configured such that it is able to interpret the signals/information being input to it from the one or more add-on systems 130, e.g. via an external control system network input, such as an external controller area network (CAN) input, of the interface/control unit 148 including the add-on interface 140. The add-on interface 140 may also easily be configured to output signals/information to the one or more add-on systems 130, via the external controller area network (CAN), such that the signals/information may be interpreted/used by the add-on systems 130. The add-on interface 140 may be arranged for converting signaling/information formats being used by the one or more add-on systems 130 to signaling/information formats being used by the one or more vehicle internal systems 120, and vice versa. Hereby, the one or more add-on systems 130 may communicate with the one or more vehicle internal systems 120, and possibly also with other systems, such as systems related to, or being included in the add-on/bodybuilder network 410.

Further, the add-on interface 140 may also be easily configured for interpreting sensor signals being provided by the one or more add-on systems 130, such that a flexibility regarding addition of sensors is achieved for the vehicle. Essentially, any type of sensor, providing any type of sensor signal having essentially any features, e.g. indicating any type of physical quantity unit, may be implemented in the one or more add-on systems 130, whereby the add-on interface 140 is configured to process the provided sensor signal accordingly. The add-on interface 140 may also be easily configured to output a processed sensor signal having suitable features to the one or more vehicle internal systems 120, such as e.g. to the instrument cluster of the driving compartment, and possibly also to other systems, such as systems/nodes related to, or being included in the add-on/bodybuilder network 410. The add-on interface 140 may for example be configured for outputting sensor signals adapted for being displayed in any suitable vehicle instrument.

The add-on network 410 may include an add-on interface configuration tool 414, which may include an external communication unit 161 arranged for communicating with the at least one internal communication unit 116 included in the vehicle. By use of the add-on interface configuration tool 414, the add-on interface 140 may easily be configured and/or defined, as is described in this document. Information related to how the add-on interface 140 is to be configured/defined may be provided based on input to a manufacturer interface entity 420 and/or a client/user interface entity 430 by a manufacturer and/or a client/user. One or more of the manufacturer interface entity 420 and the client/user interface entity 430 may be implemented as an application (APP) program, as an interface portal, as an interface program, or as any suitable equipment arranged for presenting information and/or for receiving input of information.

An add-on/bodybuilder network 410 may be arranged, e.g. in an internet cloud 160 configuration, for communication and/or configuration of the one or more add-on systems 130, and/or for communication with the manufacturer interface entity 420 and/or the client/user interface entity 430. The add-on network 410 may include a communication node 411, which may include an external communication unit 161 arranged for communicating with the at least one internal communication unit 116 included in the vehicle.

Information transmitted to and/or from the vehicle 100 may have one or more features related to one or more configured functions of the add-on interface 140 and/or related to a configured signaling format used for the connection between the at least one internal communication unit 116 and the at least one external communication unit 161. According to some embodiments, an immutable and unique identifier ID may be created based on, and assigned to, the specific configuration of the add-on interface functions and/or of the used signaling.

Generally, the add-on interface configuration tool 414, the manufacturer interface entity 420 and/or the client/user interface entity 430 is normally unaware of the features of the one or more add-on systems 130 and/or of the configuration of the add-on interface 140. Therefore, the add-on interface configuration tool 414, the manufacturer interface entity 420 and/or the client/user interface entity 430 are often also unaware of how to interpret information provided by the one or more add-on systems 130 to them. The immutable and unique identifier ID may therefore be added, e.g. as included in a packet header, to information sent from the one or more add-on systems 130. The information may then be decoded, in a codec 413 connected to the communication node 411, by usage of this immutable and unique identifier ID. The immutable and unique identifier ID may, after having been previously provided by the add-on interface 140 and/or by the add-on interface configuration tool 414, be stored in a register 412 of the add-on network 410. The codec 413 is arranged for encoding and/or decoding information transmitted from and/or to the vehicle 100, e.g. by usage of the immutable and unique identifier ID, which is then provided to the codec 413 by the register 412.

Thus, the codec 413 may detect the immutable and unique identifier ID in a packet header of information transmitted from the vehicle 100, and may therefore be able to determine the specific configuration of the add-on interface 140 and how to detect the information in the packets. Correspondingly, the immutable and unique identifier ID may also be added, e.g. in a packet header, to information transmitted to the vehicle 100. The add-on interface 140 may then, based on the immutable and unique identifier ID, easily identify to which one or more add-on systems 130 and/or one or more vehicle internal systems 120 the information is intended to be transferred.

One or more diagnosis equipment 440 may be arranged in the add-on network 410 to process diagnosis related information. Such one or more diagnosis equipment may for example be included in the manufacturer interface entity 420 and/or in the client/user interface entity 430, or may be implemented in a separate diagnosis equipment 440. The one or more diagnosis equipment 440 is normally unaware of the features of the possibly unknown one or more add-on systems 130 and/or of the configuration of the add-on interface 140. Therefore, in order to provide a generic diagnosis system, diagnostic identifiers are created based on, and assigned to, the specific configuration of the add-on interface 140 and/or the one or more add-on systems 130. Hereby, the diagnosis equipment 440 may be able to provide a reliable diagnosis also for all add-on systems 130, also for the ones being unknown for the diagnosis equipment.

Figure 5:
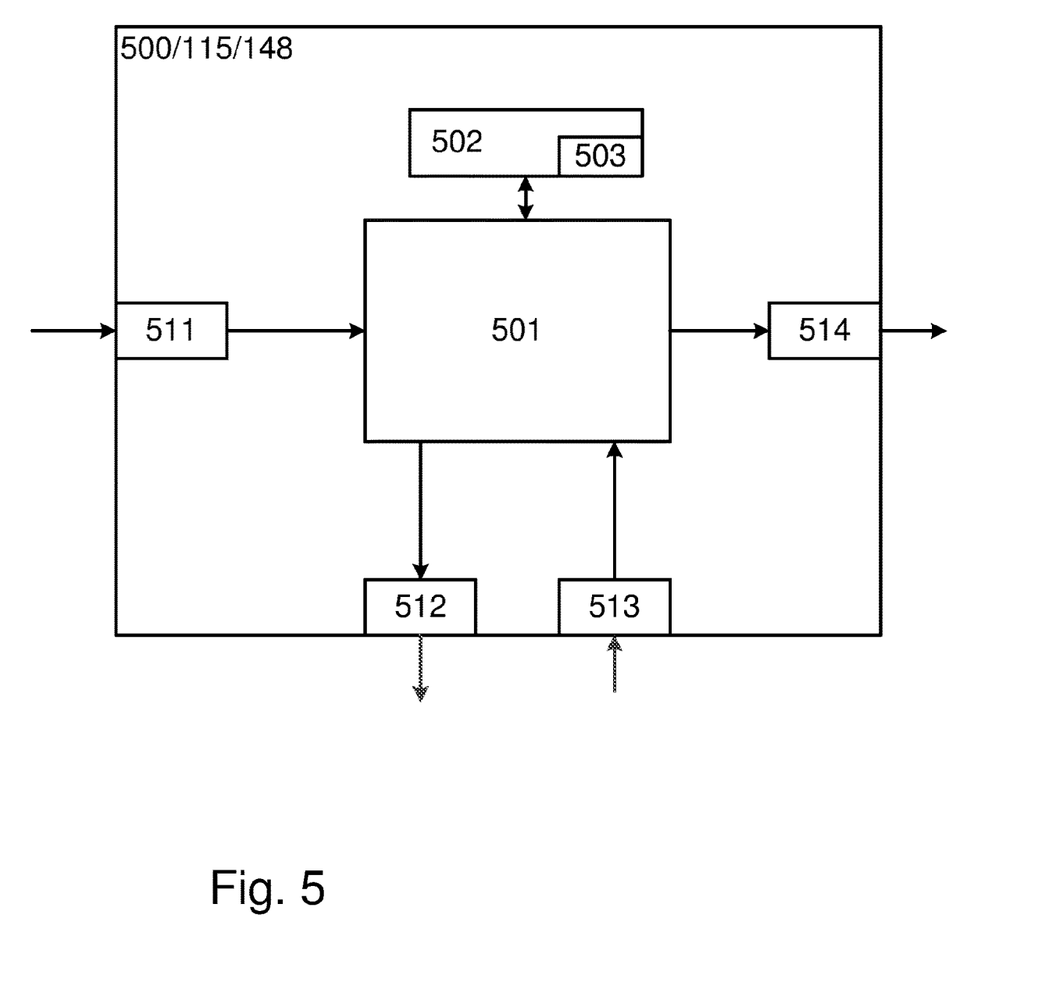
FIG. 5 is a schematic illustration of a control unit according to some embodiments of the present invention.

The person skilled in the art will appreciate that a method for configuring an add-on interface according to the present invention may also be implemented in a computer program, which, when it is executed in a computer, instructs the computer to execute the method. The computer may be included in the herein described system and/or may be coupled/connected to the herein described system. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

FIG. 5 shows in schematic representation a control unit/system/means 500/115/148. As mentioned above, the vehicle 100 may include one or more control units 115. Also, the add-on interface 140 may be implemented as a control unit 148. The control unit/system/means 500/115/148 comprises a computing unit 501, which may be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit/system/means 500/115/148, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit/system/means 500/115/148 is provided with devices 511, 512, 513, 514 for receiving and transmitting input and output signals. These input and output signals may comprise waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems within or outside the vehicle 100.

Each of the connections to the devices for receiving and transmitting input and output signals can be comprise one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 501 and that the above-stated memory may be constituted by the memory unit 502.

Control systems in modern vehicles commonly comprise communication bus systems including one or more communication buses for linking a number of electronic control units (ECU's), or controllers, and various components located on the vehicle. Such a control system may comprise a large number of control units/means and the responsibility for a specific function can be divided amongst more than one control unit/means. Vehicles of the shown type thus often comprise significantly more control units/means than are shown in FIGS. 1,3, 4 and 5, which is well known to the person skilled in the art within this technical field.

In the shown embodiment, the present invention is implemented in the control unit/system/means 500/115/148. The invention can also, however, be implemented wholly or partially in one or more other control units/systems/means already present in the vehicle, or in some control unit/system/means dedicated to the present invention.

According to an aspect of the invention, a control unit 148 arranged for configuring an add-on interface 140 of a vehicle 100 is presented. The vehicle includes at least one vehicle internal system, at least one add-on system 130 arranged in the vehicle 100 after its manufacture, and at least one internal communication unit 116 arranged for communication with at least one vehicle external communication unit 161.

The control unit 148 includes a reception unit/means 141, arranged for receiving 210, by usage of the at least one internal communication unit 161, information related to at least one node of the at least one add-on system 130. The information is provided by/transmitted from the at least one vehicle external communication unit 161.

The control unit 148 further includes a definition unit/means 142, arranged for defining 220, based on the information related to the at least one add-on node, at least one signaling used by the at least one add-on node.

The control unit 148 also includes a configuration unit/means 143, arranged for configuring 230 the add-on interface 140 by using the definition of the at least one signaling used by the at least one add-on node. As described herein, the add-on interface 140 is arranged in the vehicle 100 as an interface between the at least one vehicle internal system 120 and the at least one add-on system.

By activation of the above described reception unit/means 141, definition means unit/means 142, and configuration unit/means 143, the add-on interface 140 is configured, which has the above-mentioned advantages.

Here and in this document, units/means are often described as being arranged for performing steps of the method according to the invention. This also includes that the units/means are designed to and/or configured to perform these method steps.

The interface control unit/system/means 148 is in FIG. 1 illustrated as including separately illustrated units/means 141, 142, 143. Also, the control system/means 148 may include or be coupled to e.g. other device/means 115. These means/units/devices 141, 142, 143, 148, 115 may, however, be at least to some extent logically separated but implemented in the same physical unit/device. These means/units/devices 141, 142, 143, 148, 115 may also be part of a single logic unit which is implemented in at least two different physical units/devices. These means/units/devices 141, 142, 143, 148, 115 may also be at least to some extent logically separated and implemented in at least two different physical means/units/devices. Further, these means/units/devices 141, 142, 143, 148, 115 may be both logically and physically arranged together, i.e. be part of a single logic unit which is implemented in a single physical means/unit/device. These means/units/devices 141, 142, 143, 148, 115 may for example correspond to groups of instructions, which can be in the form of programming code, that are input into, and are utilized by at least one processor when the units/means are active and/or are utilized for performing its method step, respectively. It should be noted that the control system/means 148 may be implemented at least partly within the vehicle 100 and/or at least partly outside of the vehicle 100, e.g. in a server, computer, processor or the like located separately from the vehicle 100.

As mentioned above, the units 141, 142, 143 described above correspond to the claimed means 141, 142, 143 arranged for performing the embodiments of the present invention, and the present invention as such.

The control system according to the present invention can be arranged for performing all of the above, in the claims, and in the herein described embodiments method steps. The system is hereby provided with the above described advantages for each respective embodiment.

A skilled person also realizes that the above described system may be modified according to the different embodiments of the method of the present invention. The present invention is also related to a vehicle 100, such as a truck, a bus or a car, including the herein described control system 140 arranged for configuration of an add-on interface.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the above described embodiments. Instead, the present invention relates to, and encompasses all different embodiments being included within the scope of the independent claims.

The invention claimed is:

1. A method for configuring an add-on interface of a vehicle, wherein said vehicle comprises: at least one vehicle internal system; at least one add-on system, said add-on system being arranged in said vehicle after said vehicle is manufactured by a manufacturer; and at least one vehicle internal communication unit arranged for communication with at least one vehicle external communication unit that is remote from the vehicle, wherein the method comprises:

receiving, using said at least one vehicle internal communication unit, information related to at least one node of said at least one add-on system from said at least one vehicle external communication unit, said information including a specific signaling type used by said at least one node for communication;

creating, based on said information related to said at least one node, a definition of at least one signaling type used by said at least one node of said at least one add-on system;

configuring, by using the definition of said at least one signaling type used by said at least one node, the add-on interface, said add-on interface being arranged in said vehicle as an interface between said at least one vehicle internal system and said at least one add-on system, said configuring comprising:

receiving, from the at least one vehicle external communication unit using said at least one vehicle internal communication unit, information related to at least one functionality of said add-on interface;

creating a definition of at least one functionality based on the definition of said at least one signaling type used by said at least one node and on said information related to at least one functionality of said add-on interface;

configuring, by using the definition of said at least one functionality, said add-on interface; and based on at least the signals from the add-on system, defining logical operations that are to be performed on the signals from the add-on system in the add-on interface.

2. The method as claimed in of claim 1, wherein said creating a definition of said at least one functionality of the add-on interface is based on: said information related to at least one functionality of said add-on interface, at least one signaling type used by said at least one node, and on at least one signaling type used by one or more vehicle internal systems, such that functions and/or operations defined by the at least one functionality may use signals from the at least one vehicle internal system as input signals and/or may output a resulting output signal in a signaling format matching the at least one vehicle internal systems.

3. The method as claimed in claim 1, wherein said information related to at least functionality of said add-on interface is received from one or more of:
   a final user of said vehicle;
   at least one other part than said manufacturer, said at least one other part providing said at least one add-on system; and
   said manufacturer.

4. The method as claimed in claim 1, wherein said at least one signaling type used by said at least one node includes at least one or more in the group of:
   at least one control system network signal;
   at least one controller area network signal;
   at least one digital signal;
   at least one analog signal;
   at least one signal transferred by a wireless connection; or
   at least one signal transferred by a wired connection.

5. The method as claimed in claim 1, wherein said configuring of said add-on interface is performed without involvement of said manufacturer of said vehicle.

6. The method as claimed in claim 1, wherein said at least one vehicle external communication unit is included in or is associated with one or more of:
   at least one web or internet related unit;
   at least one internet cloud related unit;
   at least one infrastructure unit;
   at least one external communication unit included in at least one other vehicle;
   at least one server;
   at least one database;
   at least one processor; or
   at least one computer.

7. The method as claimed in claim 1, wherein said at least one internal communication unit is included in a control system network of said vehicle.

8. The method as claimed in claim 7, wherein said at least one add-on system is connected to an external control system network input of a control unit including said add-on interface.

9. The method as claimed in claim 1, wherein said at least one internal communication unit is arranged for communicating with said at least one vehicle external communication unit using one or more of:
   a wireless communication standard connection; or
   a wired connection.

10. The method as claimed in claim 1, wherein said at least one add-on system is a system provided by at least one other party than said manufacturer of said vehicle.

11. The method as claimed in claim 1, wherein said information related to at least one node of said at least one add-on system is received from one or more of:
   a final user of said vehicle;
   at least one other part than said manufacturer, said at least one other part having knowledge of said at least one add-on system; or
   said manufacturer.

12. A computer program product comprising computer program code stored on a non-transitory computer-readable medium, said computer program product used for configuring an add-on interface of a vehicle, wherein said vehicle comprises: at least one vehicle internal system; at least one add-on system, said add-on system being arranged in said vehicle after said vehicle is manufactured by a manufacturer; and at least one vehicle internal communication unit arranged for communication with at least one vehicle external communication unit that is remote from the vehicle, said computer program code comprising computer instructions to cause one or more control units to perform the following operations:
   receiving, using said at least one vehicle internal communication unit, information related to at least one node of said at least one add-on system from said at least one vehicle external communication unit, said information including a specific signaling type used by said at least one node for communication;
   creating, based on said information related to said at least one node, a definition of at least one signaling type used by said at least one node of said at least one add-on system;
   configuring, by using the definition of said at least one signaling type used by said at least one node, the add-on interface, said add-on interface being arranged in said vehicle as an interface between said at least one vehicle internal system and said at least one add-on system, said configuring comprising:
      receiving, from the at least one vehicle external communication unit using said at least one vehicle internal communication unit, information related to at least one functionality of said add-on interface;
      creating a definition of at least one functionality based on the definition of said at least one signaling type used by said at least one node and on said information related to at least one functionality of said add-on interface;
      configuring, by using the definition of said at least one functionality, said add-on interface; and
      based on at least the signals from the add-on system, defining logical operations that are to be performed on the signals the add-on system in the add-on interface.

13. A control unit arranged for configuring an add-on interface of a vehicle, said vehicle comprising: at least one vehicle internal system; at least one add-on system, said add-on system being arranged in said vehicle after said vehicle is produced by a manufacturer; and at least one vehicle internal communication unit arranged for communication with at least one vehicle external communication unit that is remote from the vehicle, said control unit being configured for:
   receiving, using said at least one vehicle internal communication unit, information related to at least one node of said at least one add-on system from said at least one vehicle external communication unit, said information including a specific signaling type used by said at least one node for communication;
   creating, based on said information related to said at least one node, a definition of at least one signaling type used by said at least one node of said at least one add-on system;
   configuring, by using the definition of said at least one signaling type used by said at least one node, the add-on interface, said add-on interface being arranged in said vehicle as an interface between said at least one vehicle internal system and said at least one add-on system, said configuring comprising:
      receiving, from the at least one vehicle external communication unit using said at least one vehicle internal communication unit, information related to at least one functionality of said add-on interface;

creating a definition of at least one functionality based on the definition of said at least one signaling type used by said at least one node and on said information related to at least one functionality of said add-on interface;
configuring, by using the definition of said at least one functionality, said add-on interface; and
based on at least the signals from the add-on system, defining logical operations that are to be performed on the signals from the add-on system in the add-on interface.

* * * * *